United States Patent
Chang et al.

(10) Patent No.: US 8,339,401 B2
(45) Date of Patent: Dec. 25, 2012

(54) CURVED SURFACE IMPORTING DEVICE AND METHOD

(75) Inventors: Chih-Kuang Chang, Taipei Hsien (TW); Xin-Yuan Wu, Shenzhen (CN); Jin-Bo Hu, Shenzhen (CN); Xiao-Chao Sun, Shenzhen (CN); Min Wang, Shenzhen (CN)

(73) Assignees: Hong Fu Kin Precision Industry (ShenZhen) Co., Ltd., Shenzhen (CN); Hon Hai Precision Co., Ltd., New Taipei (TW)

( * ) Notice: Subject to any disclaimer, the term of this patent is extended or adjusted under 35 U.S.C. 154(b) by 307 days.

(21) Appl. No.: 12/846,808

(22) Filed: Jul. 29, 2010

(65) Prior Publication Data

US 2011/0169839 A1   Jul. 14, 2011

(30) Foreign Application Priority Data

Jan. 11, 2010   (CN) .......................... 2010 1 0300174

(51) Int. Cl.
G06T 11/20 (2006.01)
G06T 17/00 (2006.01)

(52) U.S. Cl. .......................... 345/442; 345/441; 345/420

(58) Field of Classification Search .......................... None
See application file for complete search history.

(56) References Cited

OTHER PUBLICATIONS

Emad Abouel Nasr, PhD candidate and Ali Kamrani, P, Chapter 2—IGES Standard Protocol for Feature Recognition CAD System from Rapid Prototyping Theory and Practice, Springer, 2006, XXXIV, pp. 25-62.*
Maharavo Randrianarivony and Guido Brunnett, Generating Well Behaved Meshes for Parameterized Surfaces 2003, Proceedings of the 2003 International Conference on Geometric Modeling and Graphics (GMAG'03).*
Mangesh P. Bhandarkar, Blair Downie, Martin Hardwick, Rakesh Nagi, Migrating from IGES to STEP: one to one translation of IGES drawing to STEP drafting data, Computers in Industry 41 (2000) pp. 261-277.*
Fang Xiang, Su Donglin, Liu Yan, Graphical electromagnetic computing method combined with IGES files import, Electromagnetic Compatibility, 2007. EMC 2007. International, pp. 558-561.*

* cited by examiner

*Primary Examiner* — Kee M Tung
*Assistant Examiner* — Frank Chen
(74) *Attorney, Agent, or Firm* — Altis Law Group, Inc.

(57) ABSTRACT

A curved surface importing device and method imports character strings of graphic parameters and graphic attributes of graphs from an initial graphic exchange specification (IGES) document, and analyzes the character strings of each of the graphs to generate a graphic model. The curved surface importing device converts the graphic model to a plurality of free-form curves and a free-form curved surface, connects each of the free-form curves to generate a closed boundary curve, and cuts out a contour surface from the free-form curved surface according to the closed boundary curve. The curved surface importing device further meshes the contour surface using a plurality of triangles, and determines an approximate poly-line of a boundary of the contour surface. The plurality of triangles and the approximate poly-line of a boundary of the contour surface are displayed on a display screen.

15 Claims, 10 Drawing Sheets

CURVED SURFACE IMPORTING DEVICE AND METHOD

BACKGROUND

1. Technical Field

Embodiments of the present disclosure generally relate to devices and methods for importing curved surfaces, and more particularly to a curved surface importing device and method for importing curved surfaces from an initial graphic exchange specification (IGES) document.

2. Description of Related Art

Initial graphic exchange specification (IGES) document is a graphic data file. The IGES document stores graphic data such as information of points, curves, and curved surfaces. As known, the curves include conventional curves and rational curves, and the rational curves include free-form curves. The curved surfaces include conventional curved surfaces and free-form curved surfaces, where the free-form curves and the free-form curved surfaces can be edited freely. In computer aided designs (CAD), software can import the graphic data to a three-dimensional (3D) modeling software (such as CAD, and Pro-E), and convert the graphic data to the free-form curves and the free-form curved surfaces in a 3D graph. However, during the importing and converting process, data may be easily lost, the importing process is slow, and the imported data may be inaccurate.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the data "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
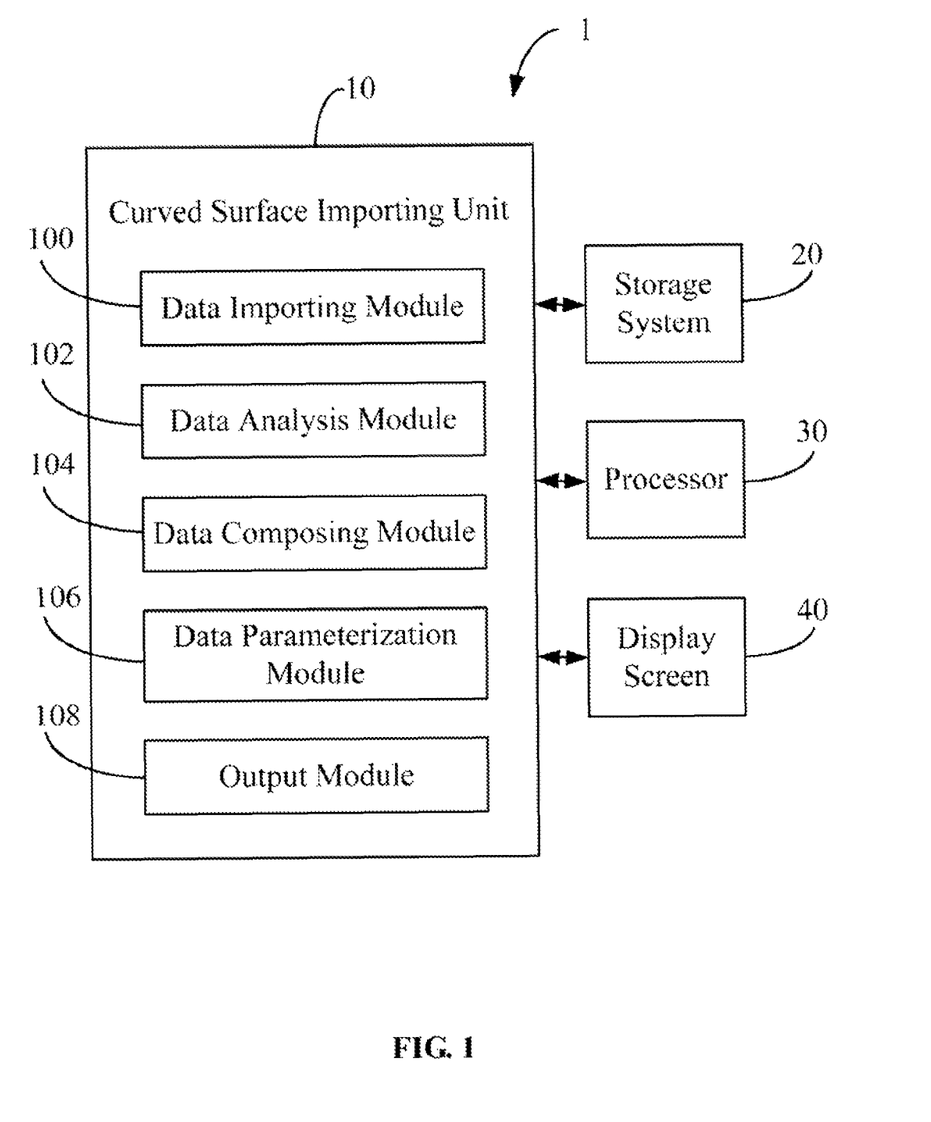
FIG. 1 is a schematic diagram of one embodiment of a curved surface importing device.

FIG. 1 is a schematic diagram of one embodiment of a curved surface importing device 1. In the embodiment, the curved surface importing device 1 may include a curved surface importing unit 10, a storage system 20, at least one processor 30, and a display screen 40. The curved surface importing unit 10 imports graphic parameters and graphic attributes of graphs from an initial graphic exchange specification (IGES) document stored in the storage system 20, converts each graph into a plurality of free-form curves and a free-form curved surface according to the graphic parameters and the graphic attributes. One or more computerized codes of the curved surface importing unit 10 are stored in the storage system 20 and executed by the at least one processor 30. The display screen 40 displays the free-form curves and the free-form curved surface of each graph as a plurality of triangles and an approximate poly-line to a user, and the storage system 20 stores the plurality of triangles and the approximate poly-line.

In one embodiment, the storage system 20 may be a magnetic or an optical storage system, such as a hard disk drive, an optical drive, or a tape drive. The storage system 20 also stores information of the curved surface, such as border points, control points, and parametric equations of the curved surface. The display device 40 may be a display screen, such as a liquid crystal display (LCD) or a cathode-ray tube (CRT) display.

In one embodiment, as shown in FIG. 1, the curved surface importing unit 10 includes a data importing module 100, a data analysis module 102, a data composing module 104, a data parameterization module 106, and an output module 108. Each of the modules 100-108 may be a software program including one or more computerized instructions that are stored in the storage system 20 and executed by the processor 30. Details of the modules 100-108 are described in FIG. 2.

Figure 2:
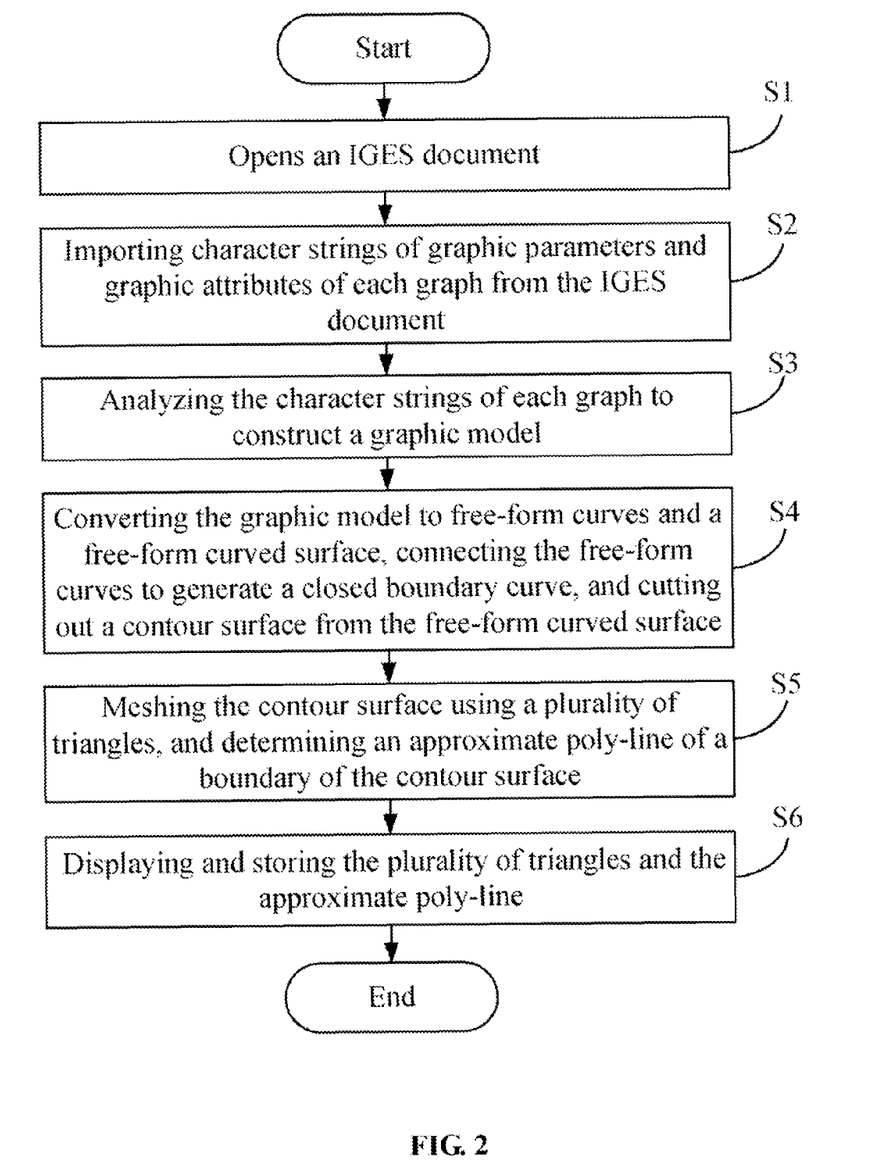
FIG. 2 is a flowchart illustrating one embodiment of a method for importing curved surfaces from an initial graphic exchange specification (IGES) document.

FIG. 2 is a flowchart illustrating one embodiment of a method for importing curved surfaces from the IGES document. Depending on the embodiment, additional blocks may be added, others removed, and the ordering of the blocks may be changed.

In block S1, the data importing module 100 reads an IGES document from the storage system 20. In one embodiment, the IGES document includes a plurality of graphic parameters and graphic attributes of graphs, such as CAD graphs, for example.

Figure 3:
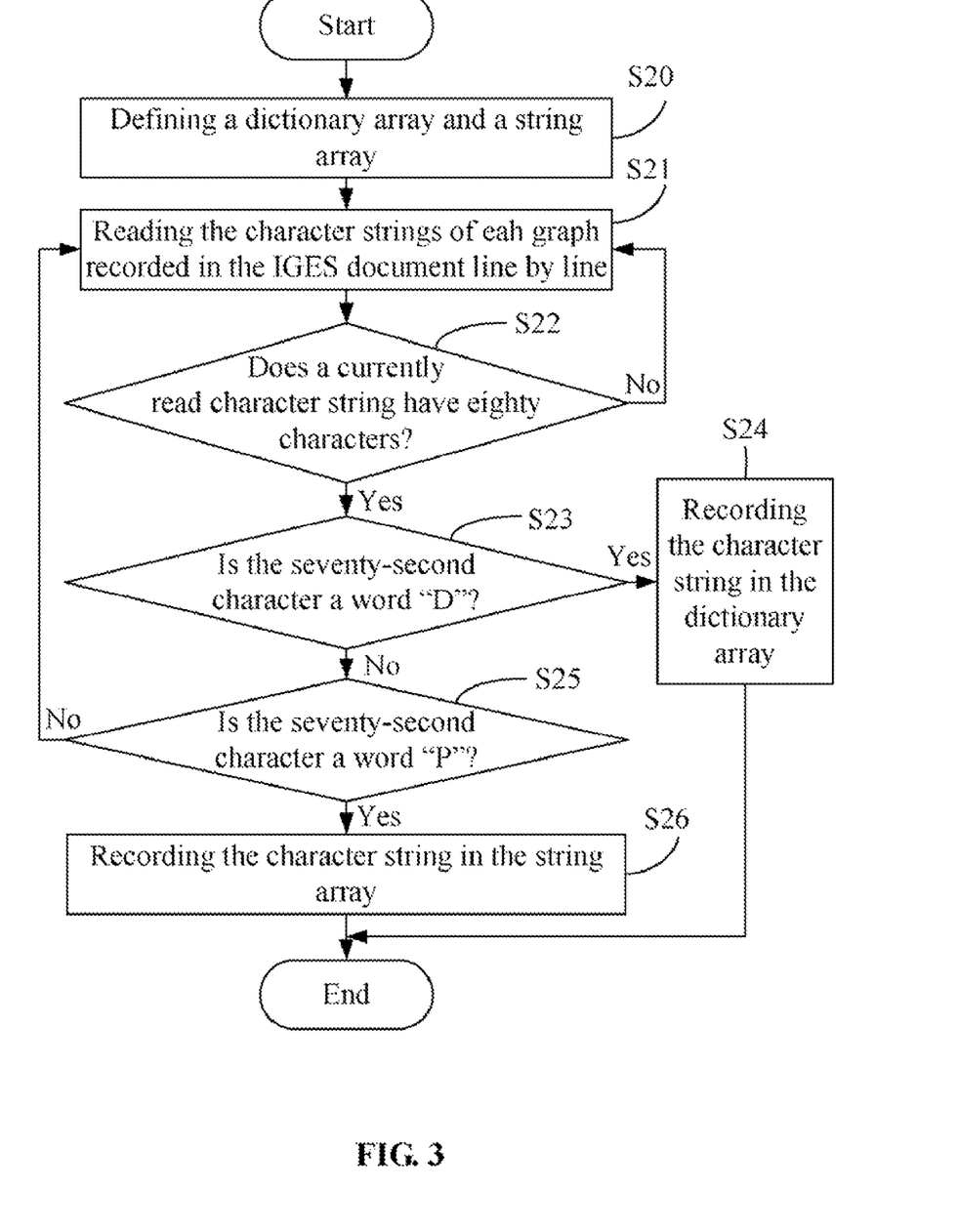
FIG. 3 is a detailed description of block S2 in FIG. 2.

In block S2, the data importing module 100 imports character strings of the graphic parameters and graphic attributes of each graph from the IGES document. Detailed description of the data importing block is shown in FIG. 3. In one embodiment, the graphic parameters may include a type identity and a vector of the graph. The graphic attributes may include a color, a line width, a layer, and a structure of the graph.

Figure 4:
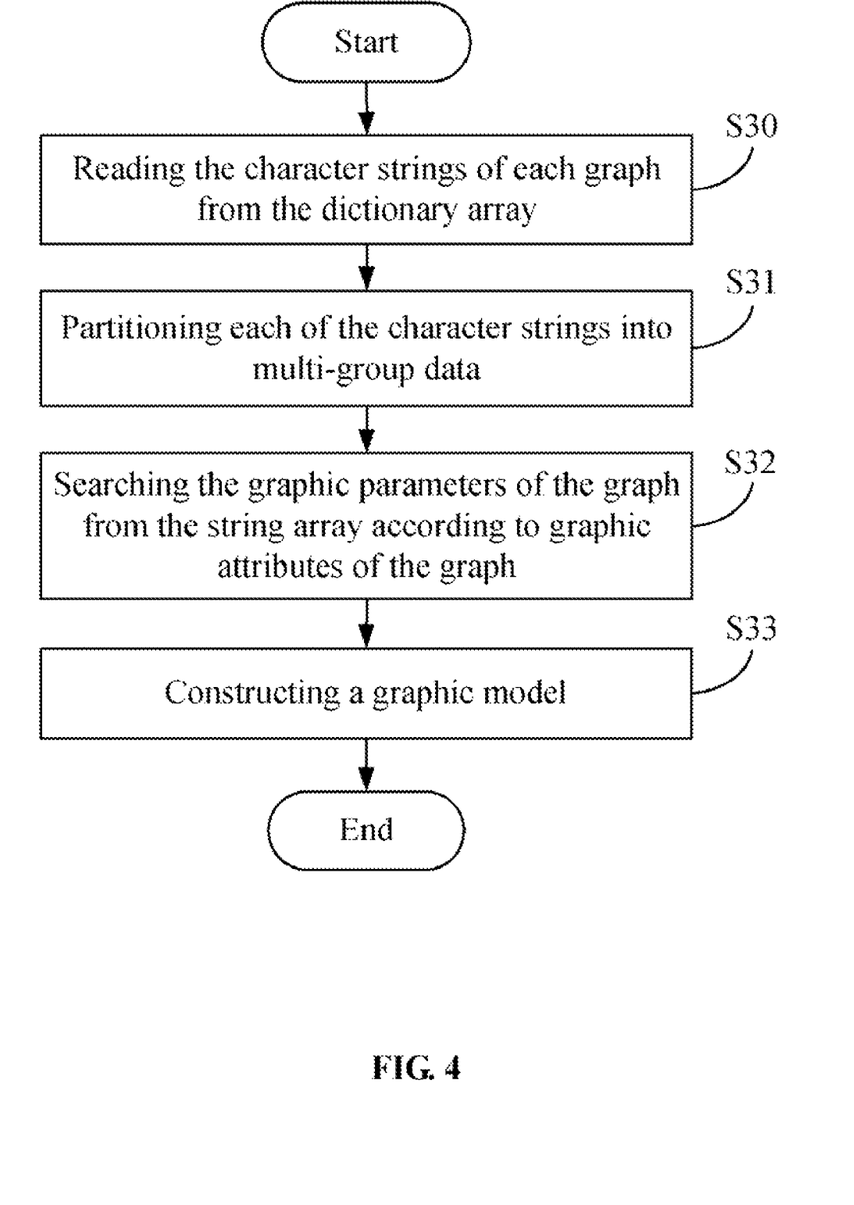
FIG. 4 is a detailed description of block S3 in FIG. 2.

In block S3, the data analysis module 102 analyzes the graphic parameters and graphic attributes to generate a graphic model. Detailed description of the data analyzing block is shown in FIG. 4.

Figure 5:
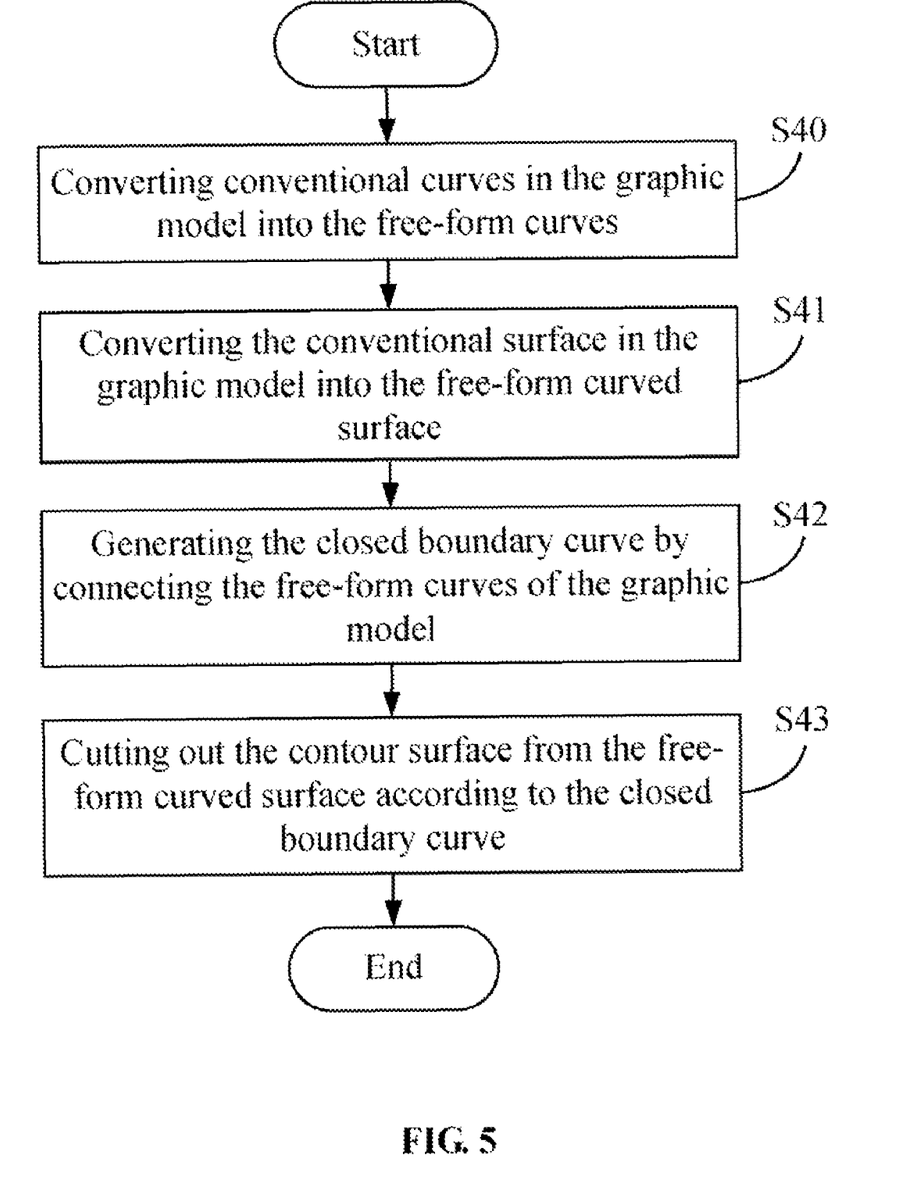
FIG. 5 is a detailed description of block S4 in FIG. 2.

In block S4, the data composing module 104 converts the graphic model to free-form curves and a free-form curved surface, connects the free-form curves to generate a closed boundary curve, and cuts out a contour surface from the free-form curved surface according to the closed boundary curve. Detailed description of the data composing block is shown in FIG. 5.

In block S5, the data parameterization module 106 meshes the contour surface using a plurality of triangles, and determines an approximate poly-line of a boundary of the contour surface. Details of the data parameterization block are described in FIG. 6.

In block S6, the output module 108 displays the plurality of triangles and the approximate poly-line on the display screen 40, and stores the plurality of triangles and the approximate poly-line in the storage system 20.

FIG. 3 is a detailed description of block S2 in FIG. 2. Depending on the embodiment, additional blocks may be added, others removed, and the ordering of the blocks may be changed.

In block S20, the data importing module 100 defines a dictionary array (denoted as "D_Array") and a string array (denoted as "P_Array"). In the embodiment, the D_Array stores the character strings of the graphic attributes of each graph, and the P_Array stores the graphic parameters of each graph.

In either of the D_Array or P_Array, each column corresponds to a character string, each character string has eighty characters, and each two character strings corresponds to the graphic attributes of one graph.

In block S21, the data importing module 100 reads the character strings of each graph recorded in the IGES document line by line.

In block S22, the data importing module 100 determines whether a currently read character string has eighty characters. If the currently read character string has eighty characters, the flow enters to block S23. If the currently read character string does not have eighty characters, for example, the character string is arbitrarily modified, the flow returns to block S21 to read the character string in the next line.

In block S23, the data importing module 100 determines whether the seventy-second ($72^{nd}$) character of the currently read character string is a word "D." If the seventy-second character of the currently read character string is the word "D," the flow enters to block S24. If the seventy-second character of the currently read character string is not the word "D," the flow enters to block S25.

In block S24, the data importing module 100 records the currently read character string in the D_Array.

In block S25, the data importing module 100 determines whether the seventy-second character of the currently read character string is a word "P." If the seventy-second character of the currently read character string is the word "P," the flow enters to block S26. If the seventy-second character of the currently read character string is not the word "P," the flow returns to block S21 to read the character string in the next line.

In block S26, the data importing module 100 records the currently read character string in the P_Array.

FIG. 4 is a detailed description of block S3 in FIG. 2. Depending on the embodiment, additional blocks may be added, others removed, and the ordering of the blocks may be changed.

In block S30, the data analysis module 102 reads the character strings of each graph from the D_Array. Each two character strings in the D_Array corresponds to the graphic attributes of the graph.

In block S31, the data analysis module 102 partitions each of the character strings of the D_Array into multi-group data. Each group of data corresponds to a graphic attribute of the graph. For example, the group data "108" represents that the graph is a panel.

In block S32, the data analysis module 102 searches the graphic parameters of the graph from the P_Array according to the graphic attributes of the graph recorded in the D_Array.

In block S33, the data analysis module 102 constructs the graphic model according to the searched graphic parameters.

In one embodiment, the graphic model may include points, curves, and curved surfaces. The curves include conventional curves and free-form curves. The surfaces include conventional curved surfaces and free-form curved surfaces.

FIG. 5 is a detailed description of block S4 in FIG. 2. Depending on the embodiment, additional blocks may be added, others removed, and the ordering of the blocks may be changed.

In block S40, the data composing module 104 converts conventional curves in the graphic model into the free-form curves. In the embodiment, the conventional curves are boundary curves of conventional surfaces, the conventional curves include straight lines, circular arcs, and elliptic arcs, for example.

In block S41, the data composing module 104 converts the conventional surface in the graphic model into the free-form curved surface. In the embodiment, the conventional surface includes a cylinder, a ruled surface, and a rotating surface, for example.

In block S42, the data composing module 104 generates the closed boundary curve by connecting the free-form curves of the graphic model.

In block S43, the data composing module 104 cuts out the contour surface from the free-form curved surface according to the closed boundary curve.

Figure 6:
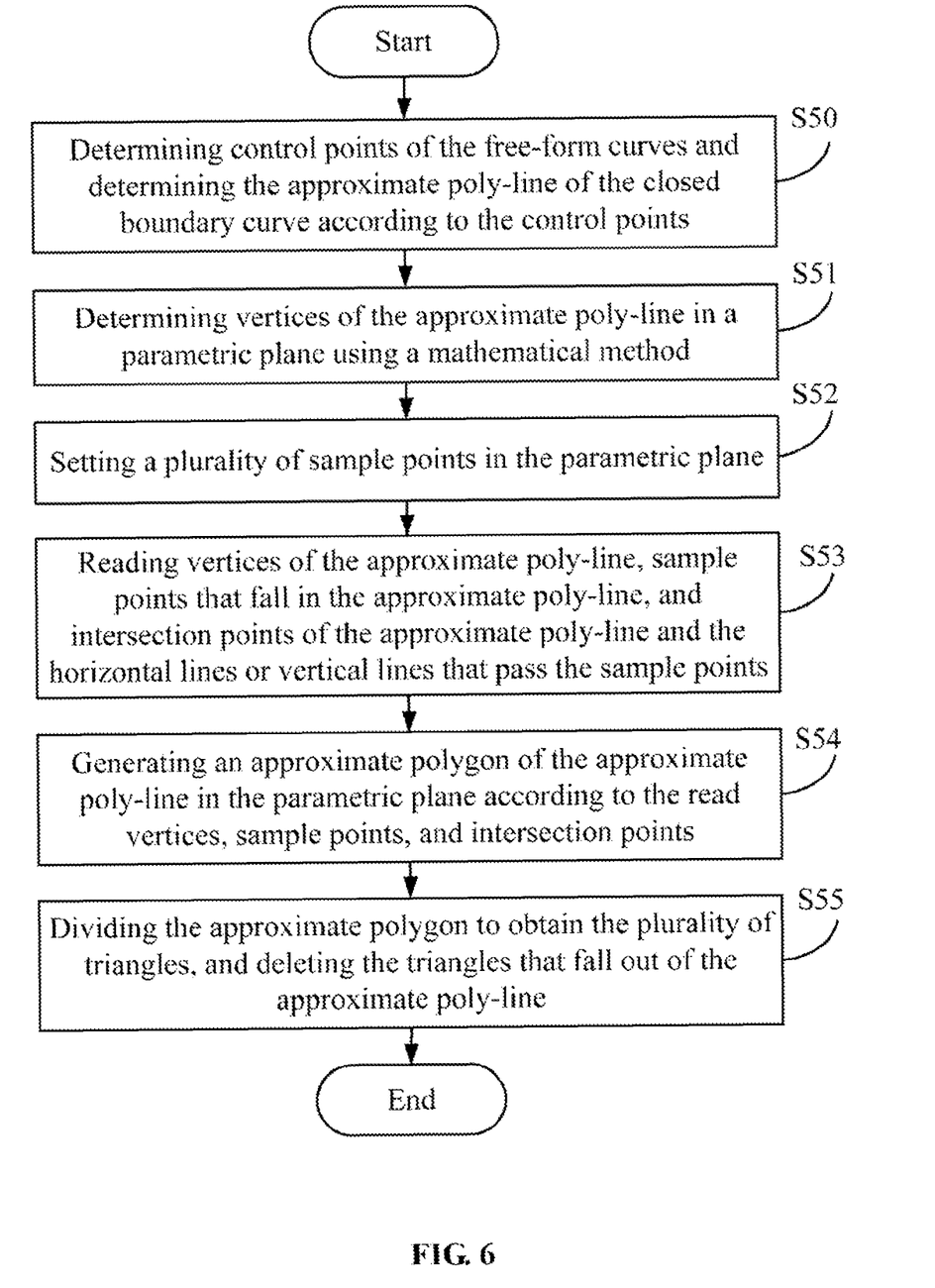
FIG. 6 is a detailed description of block S5 in FIG. 2.

FIG. 6 is a detailed description of block S5 in FIG. 2. Depending on the embodiment, additional blocks may be added, others removed, and the ordering of the blocks may be changed.

In block S50, the data parameterization module 106 determines control points of the free-form curves according to parametric equations of the free-form curves, and determines the approximate poly-line of the closed boundary curve according to the control points.

In block S51, the data parameterization module 106 determines vertices of the approximate poly-line in a parametric plane using a mathematical method.

Figure 7:
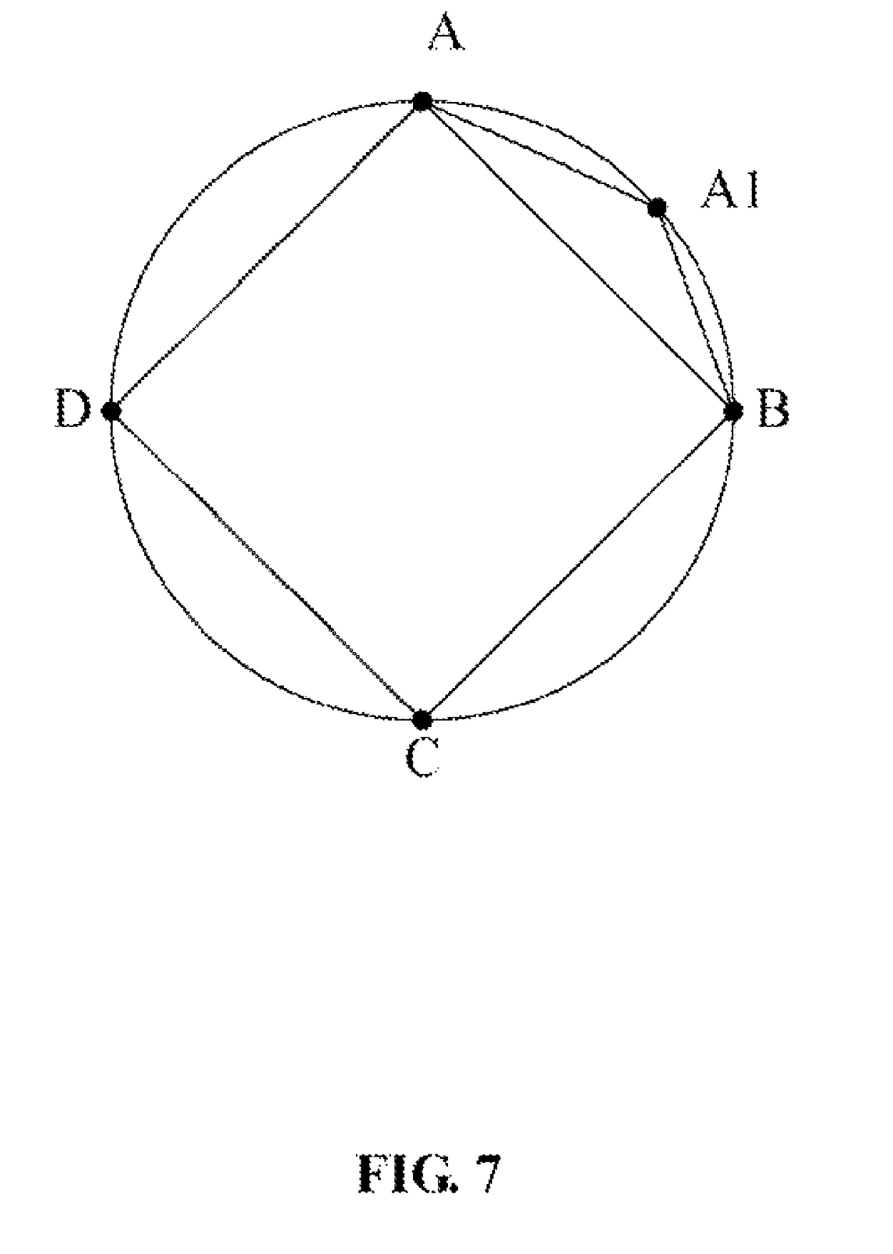
FIG. 7 illustrates one example for determining vertices of a poly-line.

In one embodiment, a horizontal direction of the parametric plane is represented by "U," and a vertical direction of the parametric plane is represented by "V." Each point in the parametric plane can be represented by (U, V), which corresponds to 2D coordinates (X, Y), where the value of U or V falls in the interval (0, 1). In one example with respect to FIG. 7, assuming that a circle is the closed boundary curve, the border processing module 11 connects four points A, B, C, and D on the circle to generate a poly-line. However, the poly-line is far from the circle, that is, the poly-line has a bad approach precision with the circle. To improve the approach precision, more vertices should be determined. For example, if the interpolation method is applied, midpoints between each two vertices of the poly-line can be obtained as new vertices of the poly-line. The more vertices of the poly-line are determined, the higher approach precision the poly-line has. It should be understood that, the poly-lines illustrated in FIGS. 7-10 only consists of segment lines for giving simple examples, in fact, a poly-line may consist of segment lines and arcs.

In block S52, the data parameterization module 106 sets a plurality of sample points in the parametric plane. In one example with respect to FIG. 8, the data parameterization module 106 averagely divides the U axis to five segments to obtain six sample points p1-p6, and averagely divides the V axis to four segments to obtain five sample points p1 and p7-p10. As a result, each of six V-lines "p1p10," "p2p11," "p3p12," "p4p13," "p5p14" and "p6p15," which pass the six sample points p1-p6, has five sample points represented by hollow spheres.

Figure 8:
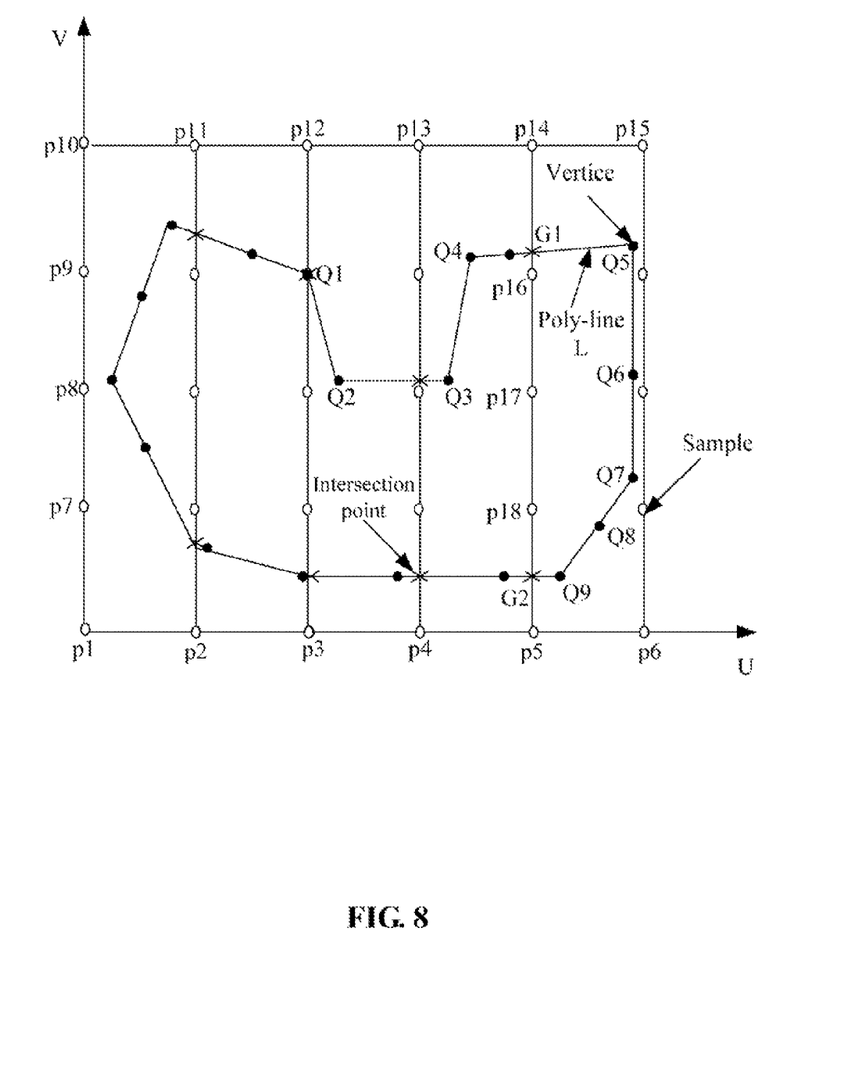
FIG. 8 illustrates sample points, vertices of a poly-line, and intersection points in a parametric plane.

In block S53, the data parameterization module 106 reads vertices of the approximate poly-line, sample points that fall in the approximate poly-line, and intersection points of the approximate poly-line and the horizontal or vertical lines that pass the sample points. Referring to FIG. 8, filled circles, such as the black filled circles labeled by "Q1," "Q2" are vertices of a poly-line L. The sample points "p16," "p17," and "p18" of a V-line "p5p14" fall in the poly-line L. The V-line "p5p14" and the poly-line L has two intersection points "G1" and "G2."

In block S54, the data parameterization module 106 generates an approximate polygon of the approximate poly-line in the parametric plane according to the read vertices, sample points, and intersection points.

In block S55, the data parameterization module 106 divides the approximate polygon to obtain the plurality of triangles by connecting the read vertices, the sample points, and the intersection points according to a determination rule, and deletes the triangles that fall out of the approximate poly-line.

Figure 9:
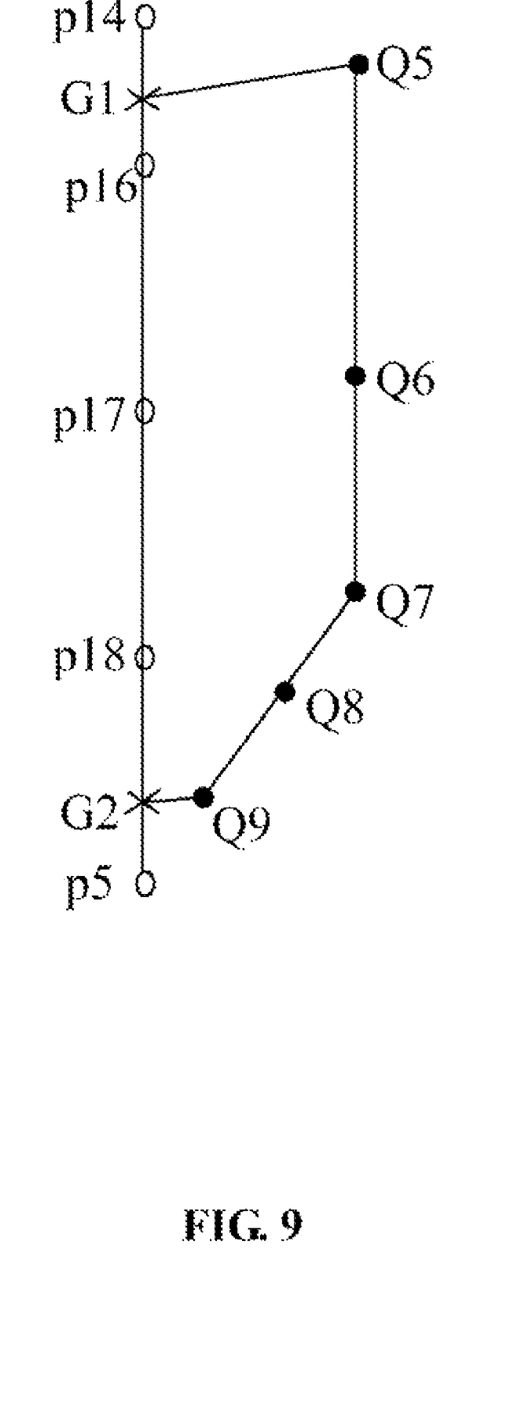
FIG. 9 and FIG. 10 illustrate generating triangles by connecting sample points, vertices of a poly-line, and intersection points in a parametric plane.
Figure 10:
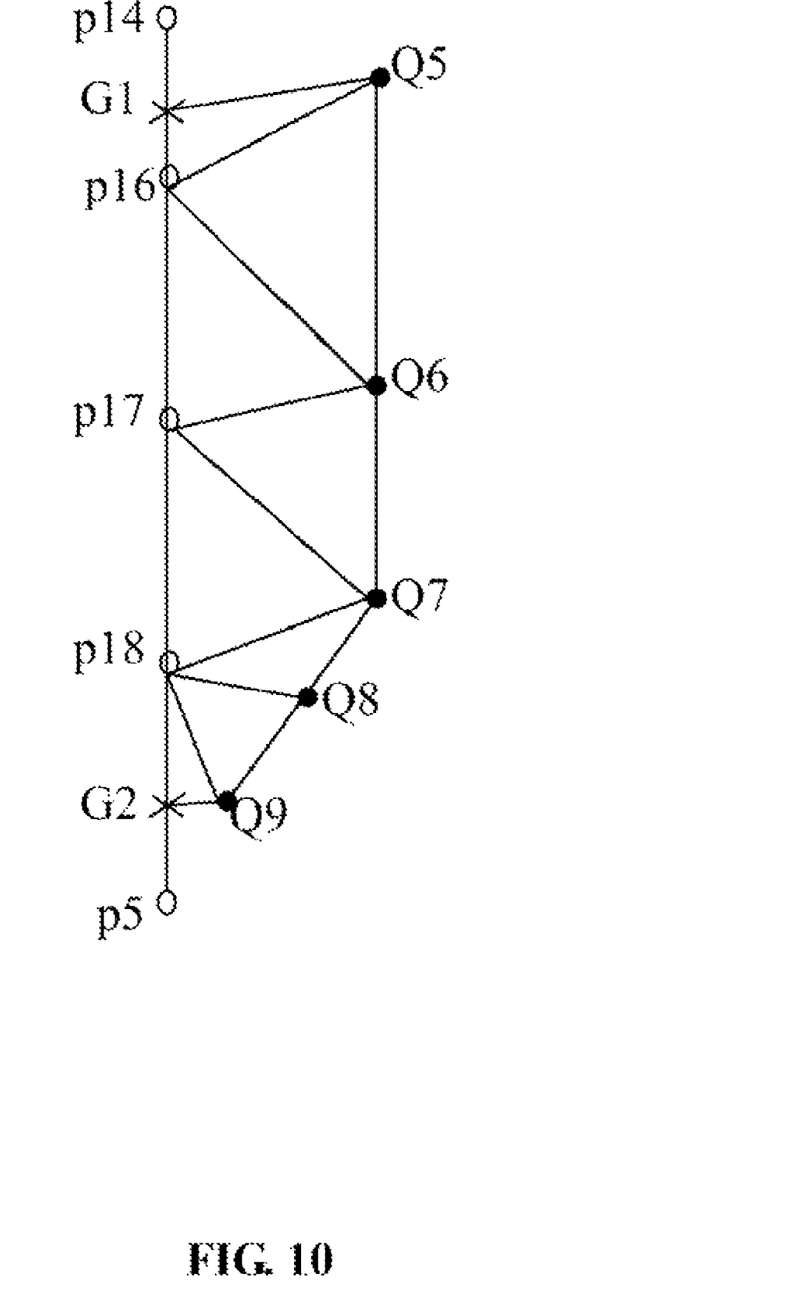

In the embodiment, the determination rule is defined that there are no vertices of the polygon that fall in a circumcircle of each obtained triangle. FIG. 9 shows a part of the polygon generated in block S405, there are five vertices Q1-Q5 of the poly-line L, three sample points "p16," "p17" and "p18" that falls in the poly-line L, and two intersection points "G1" and "G2" of the V-line "p5p14" and the poly-line L. The meshing module 13 connects the ten points to obtain eight triangles shown in FIG. 10. In FIG. 8, if the four vertices "Q1," "Q2," "Q3" and "Q4" construct two triangles which fall out of the poly-line L, the two triangles are regarded as ineffective triangles and deleted by the meshing module 13.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A curved surface importing method, the method comprising steps of:
    importing character strings of graphic parameters and graphic attributes of graphs from an initial graphic exchange specification (IGES) document stored in a storage system;
    analyzing the character strings of each of the graphs to generate a graphic model, the graphic model comprising convention curves and conventional surface;
    converting the conventional curves into a plurality of free-form curves and converting the conventional surface into a free-form curved surface, the conventional curves being boundary curves of conventional surfaces, wherein the conventional curves comprises straight lines, circular arcs and elliptic arcs, and wherein the conventional surface comprises a cylinder, a ruled surface, and a rotating surface;
    connecting each of the free-form curves to generate a closed boundary curve, and cutting out a contour surface from the free-form curved surface according to the closed boundary curve;
    meshing the contour surface using a plurality of triangles, and determining an approximate poly-line of a boundary of the contour surface; and
    displaying the plurality of triangles and the approximate poly-line on a display screen.

2. The method as described in claim 1, further comprising:
    storing the plurality of triangles and the approximate poly-line in the storage system.

3. The method as described in claim 1, wherein the importing step comprises:
    defining a dictionary array for storing character strings of the graphic attributes of each graph, and defining a string array for storing the graphic parameters of each graph;
    reading the character strings of each graph recorded in the IGES document line by line;
    upon a condition that a currently read character string of the graph has eighty characters, determining whether the seventy-second character of the currently read character string is a word "D" or "P";
    recording the currently read character string in the dictionary array upon a condition that the seventy-second character is the word "D"; or
    recording the currently read character string in the string array upon a condition that the seventy-second character is the word "P".

4. The method as described in claim 3, wherein the analysis step comprises:
    reading the character strings of the graph from the dictionary array;
    partitioning each of the character strings of the dictionary array into multi-group data;
    searching the graphic parameters of the graph from the string array according to the graphic attributes recorded in the dictionary array; and
    constructing the graphic model according to the searched graphic parameters.

5. The method as described in claim 1, wherein the meshing step comprises:
    determining control points of the free-form curves according to parametric equations of the free-form curves, and determining the approximate poly-line of the closed boundary curve according to the control points;
    determining vertices of the approximate poly-line in a parametric plane;
    setting a plurality of sample points in the parametric plane;
    reading vertices of the approximate poly-line, sample points that fall in the approximate poly-line, and intersection points of the approximate poly-line and the horizontal or vertical lines that pass the sample points,
    generating an approximate polygon of the approximate poly-line in the parametric plane according to the read vertices, sample points, and intersection points:
    dividing the approximate polygon to obtain the plurality of triangles by connecting the read vertices, sample points, and intersection points according to a. determination rule; and
    deleting the triangles that fall out of the approximate poly-line.

6. A curved surface importing device, comprising:
    at least one processor;
    a storage system;
    a display screen; and
    a curved surface importing unit stored in the storage system and executed by the at least one processor, the curved surface importing unit comprising:
    a data importing module operable to import character strings of graphic parameters and graphic attributes of graphs from an initial graphic exchange specification (IGES) document stored in a storage system;
    a data analysis module operable to analyze the character strings of each of the graphs to generate graphic model, the graphic model comprising convention curves and conventional surface;
    a data composing module operable to convert the conventional curves into a plurality of free-form curves and converting the conventional surface into a free-form curved surface, connect each of the free-form curves to generate a closed boundary curve, and cut out a contour surface from the free-form curved surface according to the closed boundary curve, the conventional curves being boundary curves of conventional surfaces, wherein the conventional curves comprises straight lines, circular arcs, and elliptic arcs, and wherein the conventional surface comprises a cylinder, a ruled surface, and a rotating surface:

a data parameterization module operable to mesh the contour surface using a plurality of triangles, and determine an approximate poly-line of a boundary of the contour surface; and an output module operable to display the plurality of triangles and the approximate poly-line on the display screen.

7. The curved surface importing device as described in claim 6, wherein the data importing module is further operable to:

define a dictionary array for storing character strings of the graphic attributes of each graph, and define a string array for storing the graphic parameters of each graph;

read the character strings of each graph recorded in the IGES document line by line;

upon a condition that a currently read character string of the graph has eighty characters, determine whether the seventy-second character of the currently read character string is a word "D"or "P";

record the currently read character string in the dictionary array upon a condition that the seventy-second character is the word or "D"; or record the currently read character string in the string array upon a condition that the seventy-second character is the word "P".

8. The curved surface importing device as described in claim 7, wherein the data analysis module is further operable to:

reading the character strings of the graph from the dictionary array;

partitioning each of the character strings of the dictionary array into multi-group data;

searching the graphic parameters of the graph from the string array according to the graphic attributes recorded in the dictionary array; and constructing the graphic model according to the searched graphic parameters.

9. The curved surface importing device as described in claim 6, wherein the data parameterization module is further operable to:

determine control points of the free-form curves according to parametric equations of the free-form curves, and determine the approximate poly-line of the closed boundary curve according to the control points;

determine vertices of the approximate poly-line in a parametric plane;

set a plurality of sample points in the parametric plane;

read vertices of the approximate poly-line, sample points that fall in the approximate poly-line, and intersection points of the approximate poly-line and the horizontal or vertical lines that pass the sample points;

generate an approximate polygon of the approximate poly-line in the parametric plane according to the read vertices, sample points, and intersection points;

divide the approximate polygon to obtain the plurality of triangles by connecting the read vertices, sample points, and intersection points according, to a determination rule; and delete the triangles that fall out of the approximate poly-line.

10. The curved surface importing, device as described in claim 6, wherein the output module is further operable to store the plurality of triangles and the approximate poly-line in the storage system.

11. A non-transitory storage medium having stored thereon instructions that, when executed by at least one processor of a curved surface importing device, causes the curved surface importing device to perform a curved surfaces importing method, the, method comprising:

importing character strings of graphic parameters and graphic attributes of graphs from an initial graphic exchange specification (IGES) document stored in a storage system;

analyzing the character strings of each of the graphs to generate a graphic model, the graphic model comprising convention curves and conventional surface;

converting the conventional curves into a plurality of free-form curves and converting the conventional surface into a free-form curved surface, connecting each of the free-form curves to generate a closed boundary curve, and cutting out a contour surface from the free-form curved surface according to the closed boundary curve, the conventional curves being boundary curves of conventional surfaces, wherein the conventional curves comprises straight lines, circular arcs; and elliptic arcs, and wherein the conventional surface comprises a cylinder a ruled surface, and a rotating surface;

meshing the contour surface using a plurality of triangles, and determining an approximate poly-line of a boundary of the contour surface; and displaying the plurality of triangles and the approximate poly-line on a display screen.

12. The non-transitory storage medium as described in claim 11, wherein the method further comprises:

storing the plurality of triangles and the approximate poly-line in the storage system.

13. The non-transitory storage medium as described in claim 11, wherein the importing step comprises:

defining a dictionary array for storing character strings of the graphic attributes of each graph, and defining a string array for storing the graphic parameters of each graph;

reading the character strings of each graph recorded in the IGES document line by line;

upon a condition that a currently read character string of the graph has eighty characters, determining whether the seventy-second character of the currently read character string is a word "D"or "P";

recording the currently read character string in the dictionary array upon a condition that the seventy-second character is the word "D"; or recording the currently read character string in the string array upon a condition that the seventy-second character is the word "P".

14. The non-transitory storage medium as described in claim 13, wherein the analysis block comprises:

reading the character strings of the graph from the dictionary array;

partitioning each of the character strings of the dictionary array into multi-group data;

searching the graphic parameters of the graph from the string array according to the graphic attributes recorded in the dictionary array; and constructing the graphic model according to the searched graphic parameters.

15. The non-transitory storage medium as described in claim 11, wherein the meshing step comprises:

determining control points of the free-form curves according to parametric equations of the free-form curves, and determining the approximate poly-line of the closed boundary curve according to the control points;

determining vertices of the approximate poly-line in a parametric plane;

setting a plurality of sample points in the parametric plane;

reading vertices of the approximate poly-line, sample points that fall in the approximate poly-line, and intersection points of the approximate poly-line and the horizontal or vertical lines that pass the sample points;

generating an approximate polygon of the approximate poly-line in the parametric plane according to the read vertices, sample points, and intersection points;

dividing the approximate polygon to obtain the plurality of triangles by connecting the read vertices, sample points, and intersection points according to a determination rule; and deleting the triangles that fall out of the approximate poly-line.

* * * * *

UNITED STATES PATENT AND TRADEMARK OFFICE
CERTIFICATE OF CORRECTION

PATENT NO.       : 8,339,401 B2                                      Page 1 of 1
APPLICATION NO.  : 12/846808
DATED            : December 25, 2012
INVENTOR(S)      : Chih-Kuang Chang et al.

It is certified that error appears in the above-identified patent and that said Letters Patent is hereby corrected as shown below:

Please replace Item (73) regarding "Assignees" on the title page of the Patent with the following:

(73) Assignees: Hong Fu Jin Precision Industry (Shenzhen) Co., Ltd., Shenzhen (CN); Hon Hai Precision Industry Co., Ltd., New Taipei (TW).

Signed and Sealed this
Twenty-sixth Day of November, 2013

Margaret A. Focarino
*Commissioner for Patents of the United States Patent and Trademark Office*